(12) United States Patent
Janisiewicz et al.

(10) Patent No.: US 6,624,538 B2
(45) Date of Patent: Sep. 23, 2003

(54) VARIABLE RELUCTANCE MOTOR WITH IMPROVED TOOTH GEOMETRY

(75) Inventors: Stanislaw Wladyslaw Janisiewicz, Endwell, NY (US); Darrin Michael Weiss, Vestal, NY (US); Andrew Zalesski, Apalachin, NY (US); Koen Alexander Gieskes, Binghamton, NY (US)

(73) Assignee: Delaware Capital Formation, Inc., Wilmington, DE (US)

( * ) Notice: Subject to any disclaimer, the term of this patent is extended or adjusted under 35 U.S.C. 154(b) by 18 days.

(21) Appl. No.: 09/820,874

(22) Filed: Mar. 30, 2001

(65) Prior Publication Data

US 2001/0045788 A1 Nov. 29, 2001

Related U.S. Application Data

(63) Continuation-in-part of application No. 09/538,897, filed on Mar. 30, 2000, now abandoned.

(51) Int. Cl.[7] ............................................... H02K 41/00
(52) U.S. Cl. ....................................................... 310/12
(58) Field of Search .............................. 310/12, 13, 14, 310/49 R, 166

(56) References Cited

U.S. PATENT DOCUMENTS

| 3,620,335 A | 11/1971 | Hendershot | 192/21.5 |
| 3,621,312 A | 11/1971 | Palmero | 310/49 R |

(List continued on next page.)

FOREIGN PATENT DOCUMENTS

| EP | 0961392 A | 12/1999 |
| GB | 2260860 A | 4/1993 |

OTHER PUBLICATIONS

C. Wu et al., "Analysis and Reduction of Vibration and Acoustic Noise in the Switched Reluctance Drive", IEEE Transactions On Industry Applications, vol. 31, No. 1, Jan./Feb. 1995.

F. Bartos, "Forward to the Past with SR Technology", Control Engineering, Nov. 1999.

D. Cameron et al., "The Origin and Reduction of Acoustic Noise in Doubly Salient Variable—Reluctance Motors", IEEE Transactions On Industry Applications, vol. 28, No. 6, Nov./Dec. 1992.

K. Regas et al., "Step–Motors that Perform Like Servos", Machine Design, Dec. 10, 1967.

J. Finch, "Variable Speed Drives Using Multi–Tooth Per Pole Switched Reluctance Motors", Department of Electrical and Electronic Engineering University of Newcastle, date unknown.

"Uncoupled Linear Motor", IBM Technical Report, date unknown, author unknown.

"Platinum DDL Direct Drive Linear Motors", pp. 1–3, date unknown, author unknown.

*Primary Examiner*—Nestor Ramirez
*Assistant Examiner*—Judson H. Jones
(74) *Attorney, Agent, or Firm*—Banner & Witcoff, Ltd.

(57) ABSTRACT

The invention provides a motor core movable relative to a stator. The motor core and the stator core comprise base members and a plurality of adjacent tooth members with improved geometry. Each tooth member comprises a tooth surface and tooth sides. The tooth sides extend from the tooth surface toward the base member. At least one of the tooth sides comprises a tip portion and a base portion. The tip portion extends from the tooth surface to the base portion. The base portion extends from the tip portion to an adjoining base portion of a tooth side of an adjacent tooth member. The tip portion is curved.

6 Claims, 5 Drawing Sheets

U.S. PATENT DOCUMENTS

| | | | |
|---|---|---|---|
| 3,664,473 A | 5/1972 | Hendershot, Jr. et al. | 192/21.5 |
| 3,672,476 A | 6/1972 | Hendershot | 192/21.5 |
| 3,680,671 A | 8/1972 | Hendershot et al. | 192/21.5 |
| 3,769,555 A | 10/1973 | Dolbachian et al. | 318/138 |
| 3,866,104 A | 2/1975 | Heine | 318/696 |
| 3,867,676 A | 2/1975 | Chai et al. | 318/135 |
| 3,953,750 A | 4/1976 | Hendershot, Jr. | 310/154.38 |
| 4,035,680 A | 7/1977 | Maeder | 310/168 |
| 4,037,122 A | 7/1977 | Bonner et al. | 310/14 |
| 4,080,724 A | 3/1978 | Gillette | 29/598 |
| 4,102,040 A | 7/1978 | Rich | 29/598 |
| 4,110,645 A | 8/1978 | Hendershot, Jr. | 310/154.07 |
| 4,143,308 A | 3/1979 | Deplante et al. | 318/138 |
| 4,358,696 A | 11/1982 | Liu et al. | 310/156.58 |
| 4,568,846 A | 2/1986 | Kapadia | 310/156.83 |
| 4,574,225 A | 3/1986 | Pershall et al. | 318/254 |
| 4,625,158 A | 11/1986 | Taenzer | 318/701 |
| 4,647,802 A * | 3/1987 | Konechy | 310/49 R |
| 4,713,570 A | 12/1987 | Mastromattei | 310/181 |
| 4,731,570 A | 3/1988 | Lee | 318/696 |
| 4,748,362 A | 5/1988 | Hedlund | 310/168 |
| 4,827,164 A | 5/1989 | Horber | 310/49 R |
| 4,883,999 A | 11/1989 | Hendershot | 310/254 |
| 5,015,903 A | 5/1991 | Hancock | 310/168 |
| 5,225,758 A | 7/1993 | Sakano et al. | 318/701 |
| 5,621,294 A | 4/1997 | Bessette et al. | 318/701 |
| 5,637,974 A | 6/1997 | McCann | 318/701 |
| 5,649,356 A | 7/1997 | Gieskes | 29/833 |
| 5,668,430 A | 9/1997 | Kolomeitsev | 310/266 |
| 5,673,974 A | 10/1997 | Lammer et al. | 299/12 |
| 5,749,432 A * | 5/1998 | Birsching | 180/443 |
| 5,811,945 A | 9/1998 | Hellinger et al. | 318/246 |
| 5,811,954 A | 9/1998 | Randall | 318/701 |
| 5,825,153 A | 10/1998 | Doyle | 318/701 |
| 5,828,195 A | 10/1998 | Zalesski | 318/366 |
| 5,838,133 A | 11/1998 | McCann | 318/701 |
| 5,852,869 A | 12/1998 | Gieskes et al. | 29/834 |
| 5,872,441 A | 2/1999 | McCann | 318/701 |
| 5,896,020 A | 4/1999 | Pyo | 318/701 |
| 5,912,542 A | 6/1999 | Zalesski | 318/701 |
| 5,923,110 A | 7/1999 | Zhao et al. | 310/91 |
| 5,955,861 A | 9/1999 | Jeong et al. | 318/701 |
| 5,982,117 A | 11/1999 | Taylor et al. | 318/254 |
| 6,025,668 A | 2/2000 | Kolomeitsev | 310/187 |
| 6,040,678 A | 3/2000 | Huh et al. | 318/701 |
| 6,057,613 A | 5/2000 | Trago | 310/49 R |
| 6,078,114 A | 6/2000 | Bessette et al. | 310/12 |

* cited by examiner

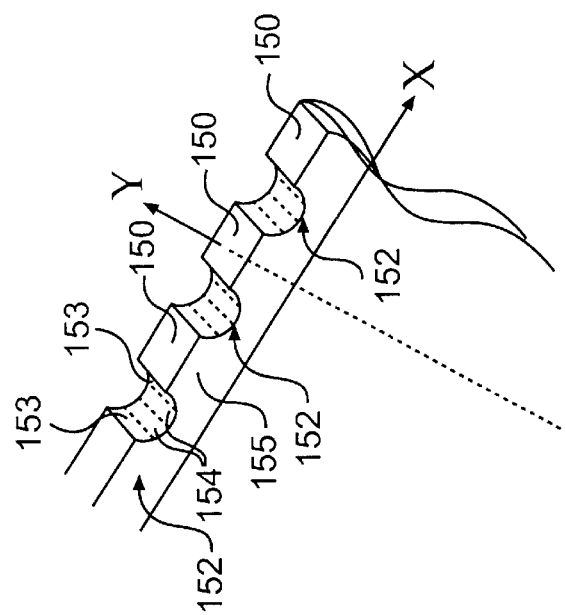
FIG. 3
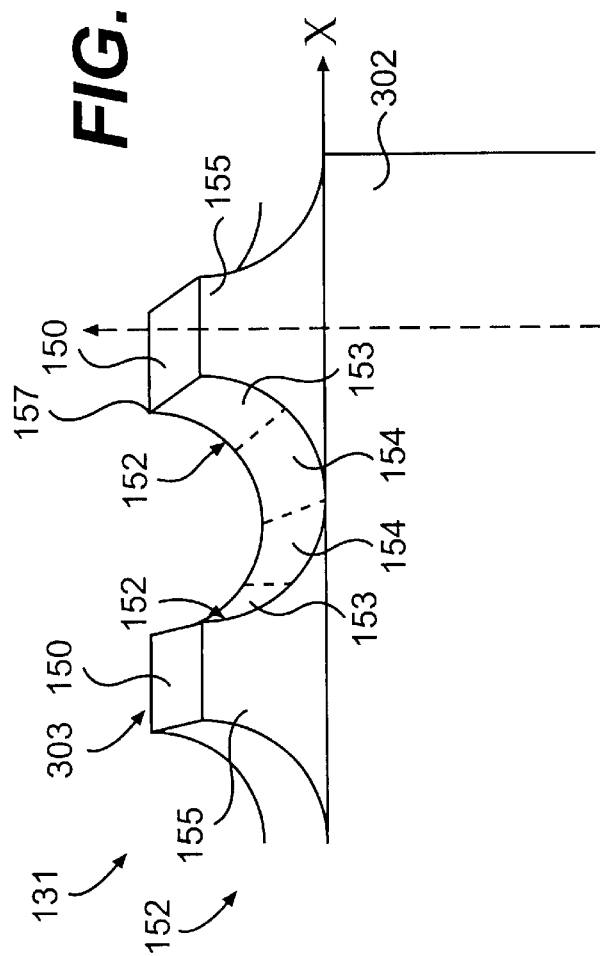
FIG. 4
FIG. 7

VARIABLE RELUCTANCE MOTOR WITH IMPROVED TOOTH GEOMETRY

This application is a continuation-in-part application of U.S. Ser. No. 09/538,897, filed Mar. 30, 2000, now abandoned, the entire contents of which are incorporated herein by reference.

The present invention relates to a variable reluctance motor comprising at least one core movable relative to at least one stator and more specifically to a variable reluctance motor core and stator having improved tooth geometry.

BACKGROUND OF THE INVENTION

Variable reluctance motors are used as direct drive motors for machines that perform repeated applications requiring a high degree of accuracy. These motors include phase assemblies comprised of one or more motor cores, and elongated stators that control the movement of tools such as robotic arms and placement heads along first and second axes. During the operation of certain machines, the motor cores and their respective stators move linearly relative to each other via magnetomotive force. The relative movement between motor core and stator causes the robotic arm or placement head to move from a first position to a second position. However, this position to position movement must be completed with a high degree of precision and at a high velocity under varying load conditions.

In some conventional linear actuated motors, the cores and stators are formed by securing a stack of members, such as laminations, together along adjoining faces. Each core member includes a plurality of adjacent teeth that extend along a longitudinal axis of the core, or lamination. The teeth of each core are intended to guide magnetic flux to the tooth surface. In some motors, stator members are also provided with teeth.

Conventional tooth shapes utilized in motors comprise adjacent teeth configured such that adjoining teeth sides form a U or V shape, or combinations of U and V shapes. For example U.S. Pat. No. 4,647,802 to Konecny discloses a tooth having a generally inverted V shape. However, the tip of the tooth includes a small untapered section having uniform width. This tooth shape comprises a straight tip portion extending from the tooth surface towards a base portion. In some variations of the conventional design, the base portion is rectangular. However, in conventional tooth geometry, regardless of the shape of the base portion, the tip portion of the tooth is a straight section. It has been found that the shape of these conventional tooth sides, while effective in directing flux, is not optimal for directing flux to the tooth surface.

SUMMARY OF THE INVENTION

The invention provides a motor core movable relative to a stator. The motor core and the stator core comprise base members and a plurality of adjacent tooth members with improved geometry. Each tooth member comprises a tooth surface and tooth sides. The tooth sides extend from the tooth surface toward the base member. At least one of the tooth sides comprises a tip portion and a base portion. The tip portion extends from the tooth surface to the base portion. The base portion extends from the tip portion to an adjoining base portion of a tooth side of an adjacent tooth member. The tip portion is curved.

BRIEF DESCRIPTION OF THE DRAWINGS

FIG. 3 is an isometric view of the motor core shown in FIG. 2 including a plurality of adjacent teeth in accordance with the invention;

FIG. 4 is an enlarged isometric view of the motor core shown in FIG. 3;

FIG. 7 is a diagram one alternative embodiment of the tooth of the present invention.

DETAILED DESCRIPTION OF THE DRAWINGS

Figure 1:
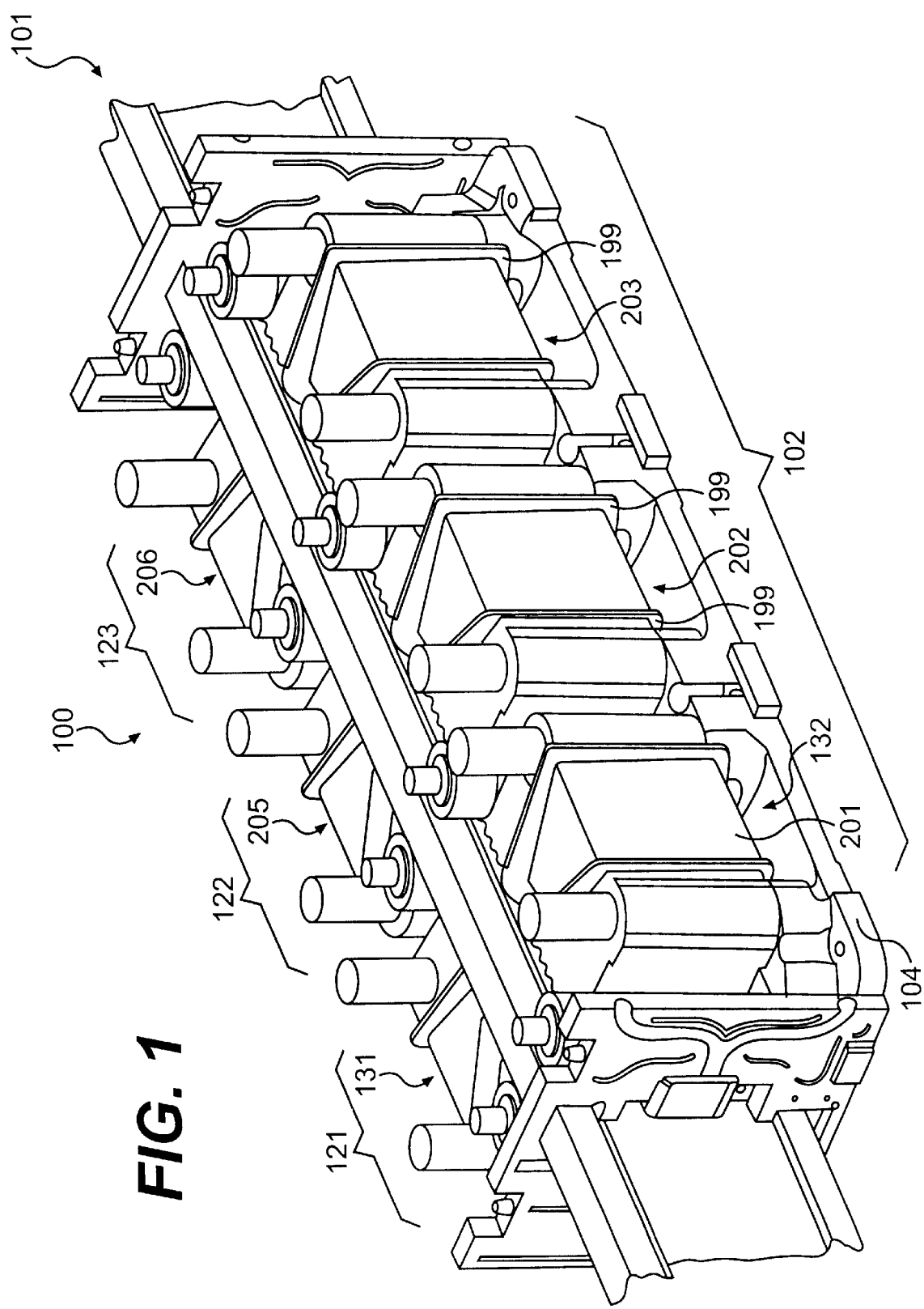
FIG. 1 is an isometric view of a variable reluctance linear motor including a phase assembly comprising a plurality of motor cores.

FIG. 1 illustrates a variable reluctance motor 100 (shown without top plate). In a first embodiment, the motor 100 is a variable reluctance linear motor that is used with machines that receive and position components on a substrate. These machines are commonly referred to as "pick and place" machines. Examples of these types of machines are described in U.S. Pat. Nos. 5,649,356 and 5,852,869. Although the motor 100 is described with respect to pick and place machines, its use it not limited only to these machines. Instead, in other embodiments, the motor 100 is incorporated into any machine that requires high force movements that must be completed with a high degree of accuracy.

The motor 100 includes a stator 101 and a phase assembly 102. The phase assembly 102 comprises a plurality of phase modules 131, 132, 205, 202, 206, 203 (each phase module including a corresponding motor core) that move relative to the stator 101 in response to a magnetomotive force. In one embodiment, the stator 101 is affixed in position and phase assembly 102 moves along the length of stator 101 in a direction parallel to either a first axis or a second axis during the operation of motor 100. When motion is required in more than one direction, a first phase assembly 102 moves relative to a first stator in a direction parallel to the first axis and a second phase assembly 102 moves relative to a second stator in a direction that extends parallel to the second axis.

According to the embodiment of the invention shown in FIG. 1, motor cores face each other in pairs. In this embodiment the pairs of cores are substantially identical and located in mirror image positions with stator 101 interposed between them.

Figure 2:
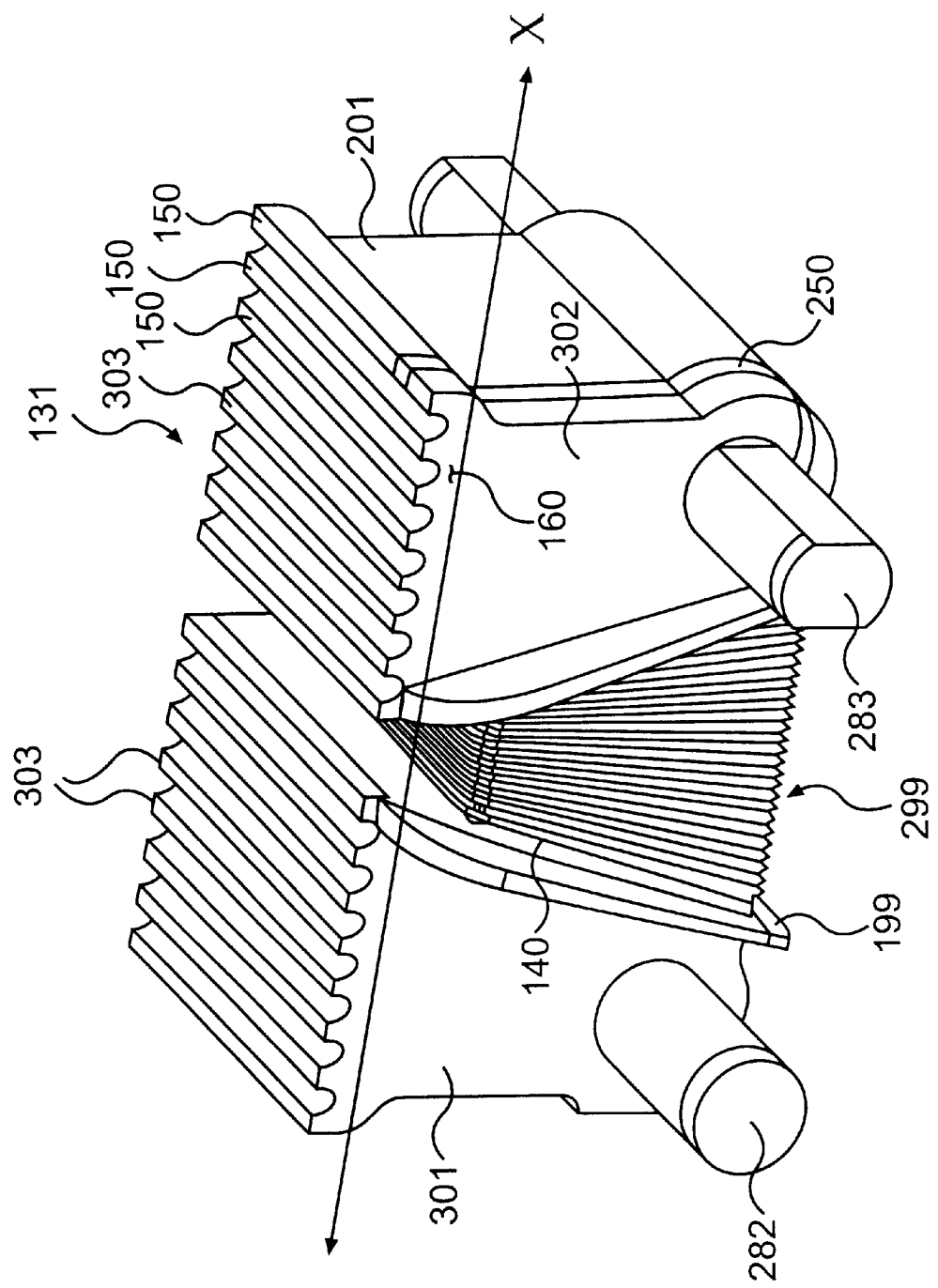
FIG. 2 is an exploded isometric view of a representative phase module, including a representative motor core, of FIG. 1 including a plurality of teeth in accordance with the invention.

FIG. 2 illustrates a phase module 131 including a motor core comprising stacked laminations 250. Laminations 250 are secured to each other. In the embodiment illustrated in FIG. 2, phase module 131 further includes a bobbin 199, and a wire coil 140 with at least one winding extending around laminations 250.

In one embodiment of the invention, each lamination 250 is substantially C-shaped as shown in FIG. 2. Each lamination 250 includes a pair of legs 301, 302 that extend away from a center section 305 of lamination 250 and in the direction of the stator 101. Each leg 301, 302 includes a plurality of adjacent teeth 303 extending along a longitudinal axis (x) of the lamination 250 as illustrated in FIGS. 3 and 4.

Each of the plurality of adjacent teeth 303 comprises a tooth surface 150, a tooth face 155, and tooth sides 152. Tooth sides 152 extend between adjacent tooth surfaces 150.

Each tooth side 152 comprises a tip portion 153 and a base portion 154. Tip portion 153 extends from an edge 157 of tooth surface 152 towards base portion 154. Base portion 154 extends from tip portion 153 to base portion 154 of adjacent tooth 303. The relative sizes, i.e., surface areas, of tip portion 153 and base portion 154 varies in different embodiments of the invention. In one embodiment of the invention tip portion 153 and base portion 154 are approximately equal in size. In another embodiment of the invention, base portion 154 is larger than tip portion 153. In yet another embodiment of the invention, tip portion 153 is smaller than base portion 154.

Regardless of its relative size, tip portion 153 is curved. As shown in the embodiment of FIGS. 3 and 4, tip portion 153 forms a convex curve with respect to transverse axis y of its corresponding tooth 303. Because of the curvature of tip portion 153, the flux density of tooth 303 is effectively directed toward tooth surface 150. The curved shape of tip portions 153 directs magnetic flux along tooth face 155 such that flux density constantly increases, at least from base portion 154 to tooth surface 150. As a result, the curved tip portions provide the motor with more force and less power loss.

Figure 5:
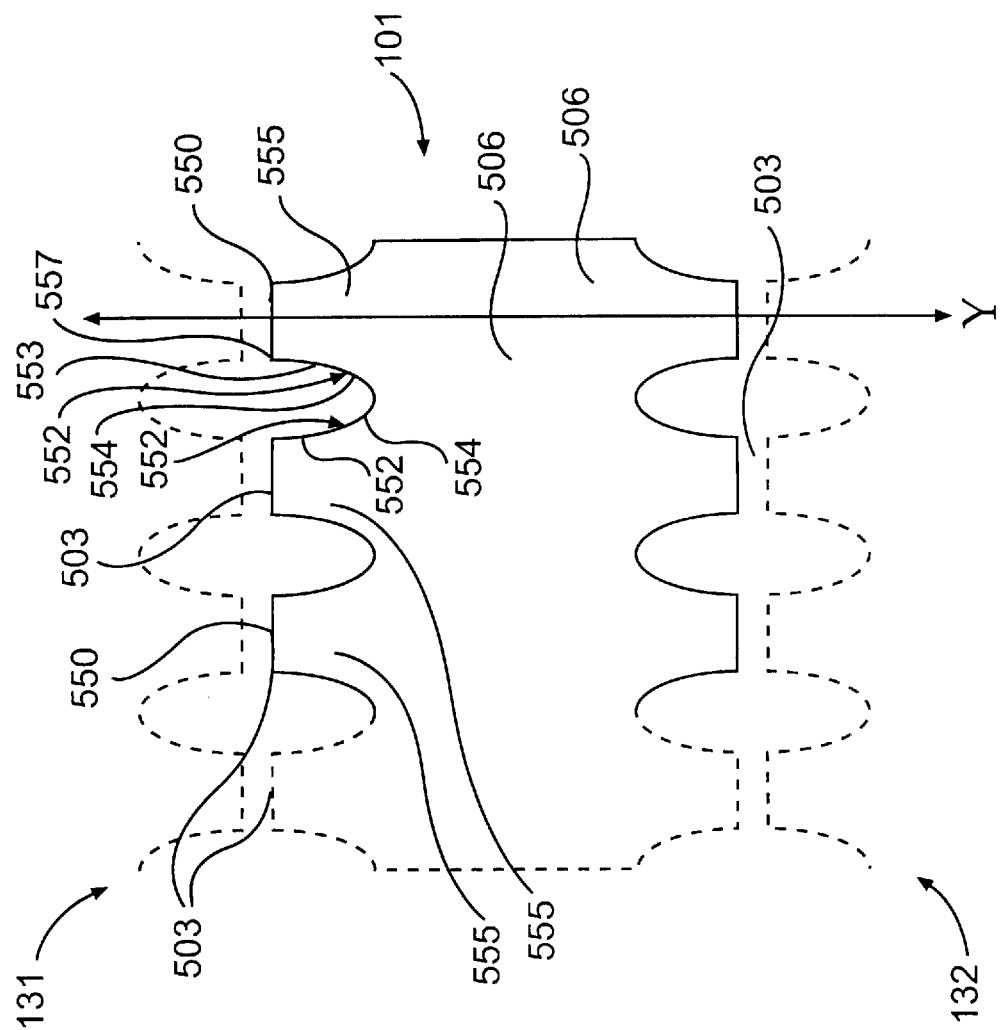
FIG. 5 is top view of a stator including a plurality of teeth according to the present invention.

In one embodiment of the invention, stator teeth 503 of stator 101 are formed in accordance with the same principles as teeth 303 of the motor core of phase module 131, as illustrated in FIG. 5. Teeth 503 of stator 101 are operatively arranged with respect to teeth 303 of phase module 131. Each of the plurality of adjacent teeth 503 comprises a tooth surface 550, a tooth face 555, and tooth sides 552. Tooth sides 552 extend between adjacent tooth surfaces 550. Each tooth side 552 comprises a tip portion 553 and a base portion 554. Tip portion 553 extends from an edge 557 of tooth surface 550 towards base portion 554. Base portion 554 extends from tip portion 553 to base portion 554 of adjacent tooth 503. As with adjacent core teeth 303, adjacent stator teeth 503 include tip portions 553 which are curved. In the embodiment illustrated in FIG. 5, tip portions 553 form a convex curve with respect to transverse axis y of corresponding tooth 503. In one embodiment of the invention in which stator 101 is interposed between phase modules 131 and 132, both sides of stator 101 include teeth. That is, one set of adjacent stator teeth 503 is positioned opposite teeth 303 of phase module 131, and another set of stator teeth is positioned opposite phase module 132, as shown in FIG. 6.

Figure 6:
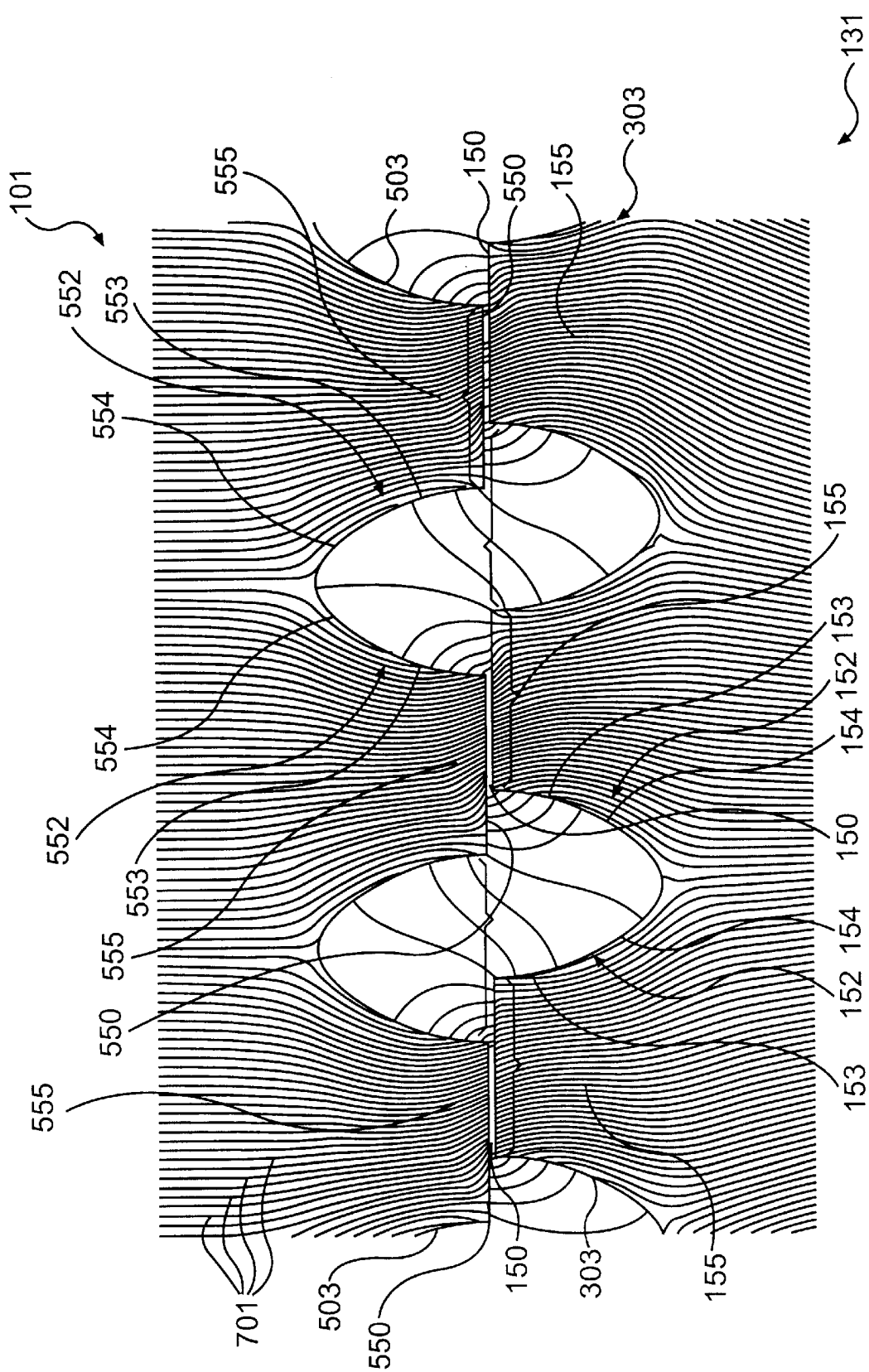
FIG. 6 is a top view of teeth of a motor core of the invention shown in relation to teeth of a stator bar of the invention and flux paths associated therewith.

FIG. 6 illustrates stator teeth 503 and core teeth 303 operatively arranged to move relative to each other during operation of motor 100. Also shown in FIG. 6 are magnetic flux lines 701 which are generated during the operation of motor 100 according to the present invention. As discussed above, the teeth 303 are distributed across the motor core of phase module 131, and the stator 101. When the motor 100 is operated, the shape of the tooth sides 152, 552 directs the magnetic flux toward tooth surfaces 150, 550 etc. such that flux density is greatest at the tooth surfaces 150, 550. Furthermore, flux lines become increasingly dense as they move toward tooth surfaces 150, 550, from base member 302 and 502 respectively.

As shown in FIGS. 3, 4, 5 and 6 at least the tip portions 153 of tooth sides 152 are curved. In one embodiment of the invention, base portion 154 is also curved. In an alternative embodiment of the invention, base portion 154 is rectangular. Other base portion geometries are possible and all remain within the scope of the invention. Regardless of the geometry of base portion 154, it is important to note that tip portions 153 are curved in all embodiments. In other words, adjacent tip portions 153 are not parallel to each other. This is in contrast to the prior art "U" shape, and variations thereof, in which tip portions are form by parallel lines. Furthermore, unlike some tooth geometry of the prior art, tip portions 153 do not extend orthogonally, at right angles, from the plane of tooth surfaces 150. Therefore, the general shape formed by adjacent tooth sides 152 is approximately a Gothic arch in one embodiment of the invention.

An alternative embodiment of the invention is illustrated in FIG. 7, in which is shown a plurality of adjacent teeth 403, each tooth comprising a tooth surface 450 and tooth sides 452. Tooth sides 452 extend between adjacent tooth surfaces 450. Each tooth side 452 comprises a tip portion 453 and a base portion 454. Tip portion 453 extends from an edge 457 of tooth surface 452 towards base portion 454. Base portion 454 extends from tip portion 453 to base portion 454 of adjacent tooth 303. In the embodiment of FIG. 7, base portion 454 comprises straight lines. Tip portion 453 is curved.

While the above description contains many specifics, these should not be construed as limitations on the scope of the invention, but rather as examples. Other variations are possible. Even though the grooves have been described with respect to a variable reluctance linear motor, the present invention is not limited to variable reluctance linear motors. The present invention is applicable to any motor that utilizes generated magnetic flux to propel or otherwise move a member in at least one direction. The grooves of the present invention could be used with any motor that includes an armature that moves relative to a stator. Accordingly, the scope of the present invention should be determined not by the embodiments illustrated above, but by the appended claims and their legal equivalents.

We claim:

1. A motor comprising:
a stator and at least one phase assembly, each phase assembly including a plurality of phase units, said stator and phase units each including a plurality of teeth, said teeth each having a tooth surface with a length extending along a plane, adjacent said tooth surfaces being separated by a geometric shaped groove extending from a respective tooth surface, each said groove having opposing tooth sides, said opposing tooth sides each including a first portion having a first arc with a first arc center of origin located below said tooth plane, and at least a second portion having a second arc with a second arc center of origin located above said tooth surface plane.

2. The motor of claim 1 wherein the length of said first groove portion is greater than or equal to the length of said second groove portion.

3. The motor of claim 1 wherein the length of said first groove portion is less than the length of said second groove portion.

4. The motor of claim 1 wherein the length of said separation is equal to or greater than the length of said tooth surface.

5. The motor of claim 1 wherein the length of said separation is less than the length of said tooth surface.

6. The motor of claim 1 wherein an angle formed by the first portion extending from the tooth surface is greater than ninety degrees.

* * * * *